United States Patent
Carr et al.

(10) Patent No.: US 12,165,395 B2
(45) Date of Patent: Dec. 10, 2024

(54) DATA-DRIVEN GHOSTING USING DEEP IMITATION LEARNING

(71) Applicant: Disney Enterprises, Inc., Burbank, CA (US)

(72) Inventors: George Peter Kenneth Carr, Allison Park, PA (US); Hoang M. Le, Pasadena, CA (US); Yisong Yue, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 956 days.

(21) Appl. No.: 15/830,710

(22) Filed: Dec. 4, 2017

(65) Prior Publication Data
US 2018/0157974 A1 Jun. 7, 2018

Related U.S. Application Data

(60) Provisional application No. 62/430,337, filed on Dec. 5, 2016.

(51) Int. Cl.
*G06N 3/08* (2023.01)
*A63B 24/00* (2006.01)
(Continued)

(52) U.S. Cl.
CPC .......... *G06V 10/82* (2022.01); *A63B 24/0006* (2013.01); *G06N 3/08* (2013.01);
(Continued)

(58) Field of Classification Search
CPC ...... G06N 3/08; G06N 3/0454; A63B 24/006; A63B 2024/0015; A63B 24/0006;
(Continued)

(56) References Cited

U.S. PATENT DOCUMENTS 9,536,191 B1 * 1/2017 Arel ................. G06N 20/00
2011/0112997 A1 * 5/2011 Sabe ................ G06N 20/00
706/12

(Continued)

OTHER PUBLICATIONS

Zach Lowe, Lights, Cameras, Revolution (Year: 2013).*
(Continued)

*Primary Examiner* — Michael J Huntley
*Assistant Examiner* — Sehwan Kim
(74) *Attorney, Agent, or Firm* — Fay Kaplun & Marcin, LLP

(57) ABSTRACT

One embodiment provides a method, comprising: training, using deep imitation learning, a neural network associated with a predetermined ghosting model to predict player movements for at least one player during at least one sequence in a game; receiving, at an information handling device, tracking data associated with a player movement path for the at least one player during the at least one sequence; analyzing, using a processor, the tracking data to determine at least one feature associated with the at least one player at a plurality of predetermined time points during the at least one sequence; and determining, using the predetermined ghosting model and the at least one feature, a ghosted movement path for the at least one player beginning from one of the plurality of predetermined time points. Other aspects are described and claimed.

23 Claims, 8 Drawing Sheets

(51) Int. Cl.
G06V 10/44 (2022.01)
G06V 10/70 (2022.01)
G06V 10/82 (2022.01)
G06V 20/40 (2022.01)
G06V 40/20 (2022.01)
G06N 3/045 (2023.01)
G06V 10/62 (2022.01)

(52) U.S. Cl.
CPC ............ *G06V 10/454* (2022.01); *G06V 10/70* (2022.01); *G06V 20/41* (2022.01); *G06V 40/23* (2022.01); *A63B 2024/0015* (2013.01); *G06N 3/045* (2023.01); *G06V 10/62* (2022.01)

(58) Field of Classification Search
CPC ........... G06K 9/00342; G06K 9/00718; G06K 9/4628; G06K 9/62; G06K 2009/3291; G06V 10/454; G06V 20/41; G06V 40/23; G06V 10/62
USPC .......................................................... 706/16
See application file for complete search history.

(56) References Cited

U.S. PATENT DOCUMENTS

| | | | | |
|---|---|---|---|---|
| 2015/0131845 | A1* | 5/2015 | Forouhar | G06V 20/44 382/100 |
| 2016/0256780 | A1* | 9/2016 | Meyer | A63F 13/812 |
| 2017/0001118 | A1* | 1/2017 | Ibrahim | H04N 21/23418 |
| 2017/0109940 | A1* | 4/2017 | Guo | G06T 7/30 |
| 2018/0056520 | A1* | 3/2018 | Ozaki | B25J 13/084 |

OTHER PUBLICATIONS

Zach Lowe, The SportVU Follow-up: Answering the most common Questions and more Ghost Raptors (Year: 2013).*

Kyunglyul Hyun, Motion Grammars for Character Animation (Year: 2016).*

Bialkowski, Alina, et al. "Large-scale analysis of soccer matches using spatiotemporal tracking data." 2014 IEEE international conference on data mining. IEEE, 2014. (Year: 2014).*

Kuhn, Harold W. "The Hungarian method for the assignment problem." Naval research logistics quarterly 2.1-2 (1955): 83-97. (Year: 1955).*

Vales-Alonso, Javier, et al. "SAETA: A smart coaching assistant for professional volleyball training." IEEE Transactions on Systems, Man, and Cybernetics: Systems 45.8 (2015): 1138-1150. (Year: 2015).*

Weigel, Thilo, Klaus Rechert, and Bernhard Nebel. "Behavior recognition and opponent modeling for adaptive table soccer playing." Annual Conference on Artificial Intelligence. Berlin, Heidelberg: Springer Berlin Heidelberg, 2005. (Year: 2005).*

Wang, Kuan-Chieh, and Richard Zemel. "Classifying NBA offensive plays using neural networks." Proceedings of MIT Sloan sports analytics conference. vol. 4. 2016. (Year: 2016).*

Yokoya, Ryunosuke, et al. "Experience-based imitation using RNNPB." Advanced Robotics 21.12 (2007): 1351-1367. (Year: 2007).*

Raza, Saleha, and Sajjad Haider. "Using imitation to build collaborative agents." ACM Transactions on Autonomous and Adaptive Systems (TAAS) 11.1 (2016): 1-21. (Year: 2016).*

* cited by examiner

DATA-DRIVEN GHOSTING USING DEEP IMITATION LEARNING

CLAIM FOR PRIORITY

This application claims priority to U.S. Provisional Patent Application Ser. No. 62/430,337, filed Dec. 5, 2016, and which is incorporated by reference herein.

BACKGROUND

Current state-of-the-art sports statistics compare players and teams to league average performance. For example, metrics such as "Wins-above-Replacement" (WAR) in baseball, "Expected Point Value" (EPV) in basketball and "Expected Goal Value" (EGV) in soccer and hockey are now commonplace in performance analysis. Such measures provide analysts with a variety of useful statistical information such as, for example, how a player or team compares to other players or teams in their respective league or how a player's or team's current performance compares to their expected performance.

BRIEF SUMMARY

In summary, one aspect provides a method, comprising: training, using deep imitation learning, a neural network associated with a predetermined ghosting model to predict player movements for at least one player during at least one sequence in a game; receiving, at an information handling device, tracking data associated with a player movement path for at least one player during the at least one sequence; analyzing, using a processor, the tracking data to determine at least one feature associated with the at least one player at a plurality of predetermined time points during the at least one sequence; and determining, using the predetermined ghosting model and the at least one feature, a ghosted movement path for the at least one player beginning from one of the plurality of predetermined time points.

Another aspect provides an information handling device, comprising: a processor; a memory device that stores instructions executable by the processor to: train, using deep imitation learning, a neural network associated with a predetermined ghosting model to predict player movements for at least one player during at least one sequence in a game; receive tracking data associated with a player movement path for at least one player during the at least one sequence; analyze the tracking data to determine at least one feature associated with the at least one player at a plurality of predetermined time points during the at least one sequence; and determine, using the predetermined ghosting model and the at least one feature, a ghosted movement path for the at least one player beginning from one of the plurality of predetermined time points.

A further aspect provides a product, comprising: a storage device that stores code, the code being executable by a processor and comprising: code that trains a neural network associated with a predetermined ghosting model to predict player movements for at least one player during at least one sequence in a game; code that receives tracking data associated with a player movement path for at least one player during the at least one sequence; code that analyzes the tracking data to determine at least one feature associated with the at least one player at a plurality of predetermined time points during the at least one sequence; and code that determines, using the predetermined ghosting model and the at least one feature, a ghosted movement path for the at least one player beginning from one of the plurality of predetermined time points.

Yet a further aspect provides an information handling device, comprising: a processor; a memory device that stores instructions executable by the processor to: receive, on a display screen of the information handling device, user sketch input corresponding to offensive player positions and offensive player movement paths; receive activation input to animate the user sketch input, wherein the animation of the user sketch input comprises movement of the offensive players along the offensive player movement paths; determine, using a predetermined ghosting model, ghosted movement paths for defensive players based on the offensive player positions and the offensive player movement paths; and provide, based on the determining, a visualization of the defense players executing the ghosted movement paths responsive to the offensive player movement paths.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
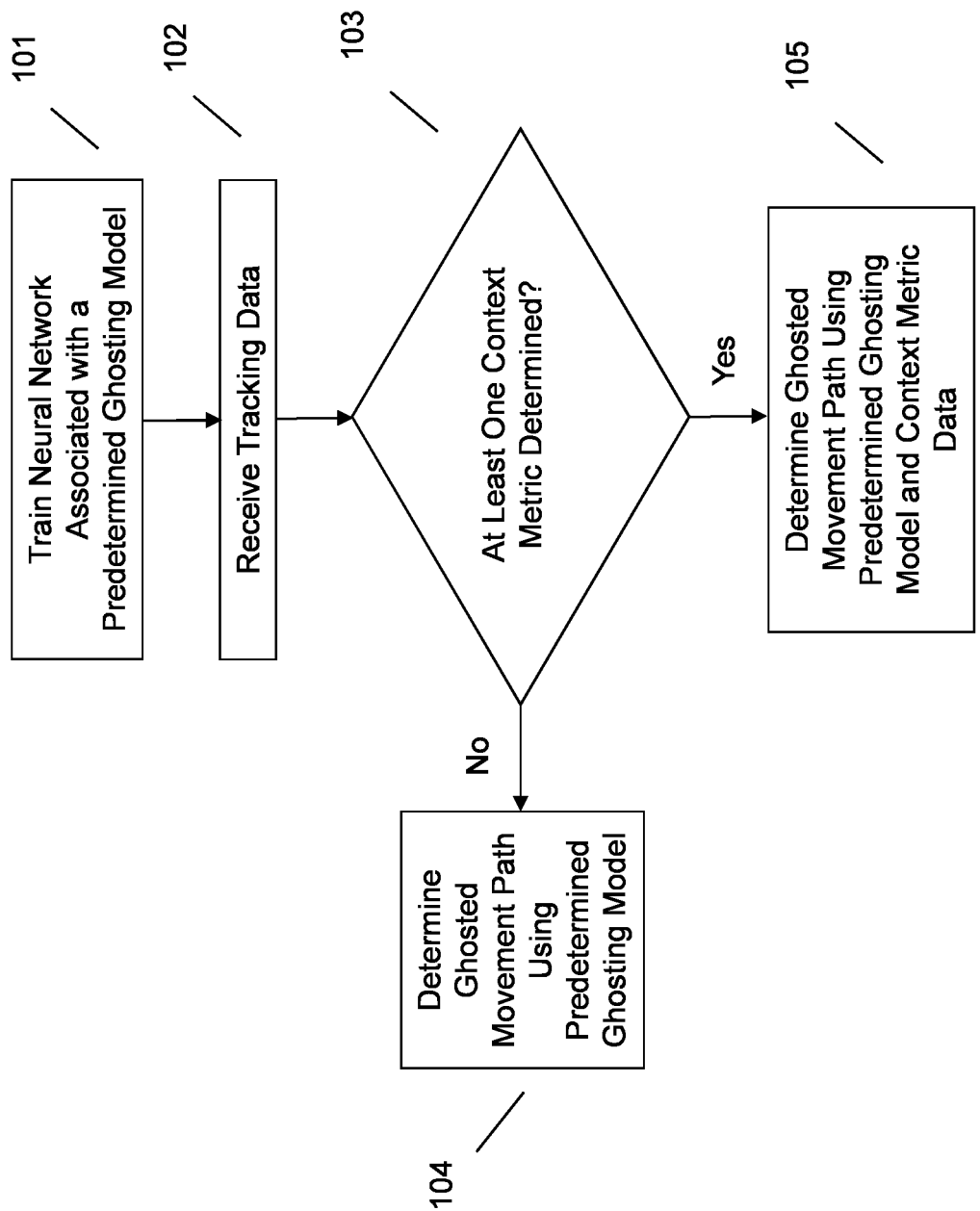
FIG. 1 illustrates an example method of determining a ghosted movement path for at least one player

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although current state-of-the-art sports metrics have enhanced our ability to analyze, compare, and value performance in sports; these metrics are inherently limited because they are tied to a discrete outcome of a specific event. For example, Expected Point Value (EPV) for basketball focuses on estimating the probability of a player making a shot based on the current situation and is determined using enormous amounts of historical data. The general use case is then to aggregate these outcomes and compare and rank them to see how various players and teams compare to each other. However, these conventional approaches are unable to provide information on how teams create time and space for scoring opportunities at the fine-grain level.

With the widespread (and growing) availability of player and ball tracking data, advances in statistical analysis, and more particularly player "ghosting," have enabled users the ability to analyze and compare fine-grain movement patterns. Through ghosting, users may be able to see what a defensive player should have done instead of what they actually did. The movements of the ghosted player may be super-imposed against video or image data of the real player, allowing for a convenient and informative visual comparison of the differences between the two movement patterns. However, the development of a computer program capable of such analytical and comparison functions requires substantial manual annotation, which is time-consuming and cumbersome. Additionally, due to the dynamic, continuous and highly strategic nature of sports, manually describing strategy at a fine-grain level is equally problematic.

Accordingly, an embodiment utilizes deep imitation learning to achieve automatic data-driven ghosting. In an embodiment, a neural network associated with a predetermined ghosting model (e.g., league average ghosting model, team-specific ghosting model, player-specific ghosting model, etc.) may be trained to predict player movements for a player or team during a sequence in a game. For example, using a team-specific ghosting model, the neural network may be able to predict how, when faced with a particular defensive scenario in a game, players on a particular team may have executed their defensive movements. The training methodologies used to train the neural network are described in greater detail further on in the specification.

After training of a predetermined ghosting model is complete, an embodiment may receive tracking data associated with a player movement path for one or more players during a particular in-game sequence. The player movement path may correspond to the actual movements that the one or more players made in the game. An embodiment may then analyze the tracking data to determine a feature (e.g., a distance between the player and another defensive or attacking player, a distance between the player and a game object (e.g., game ball, basketball hoop, football end zone, soccer net, etc.), fatigue of the player, etc.) associated with the one or more players at different time points during the sequence. For example, assuming a defensive sequence is 10 seconds long, during the course of the sequence the players' spatial relationships between themselves and the ball change so that a feature for a particular player at the 2 second mark of the sequence is different than at the 7 second mark of the sequence.

An embodiment may then determine a ghosted movement path for the one or more players from a time point in the sequence using the predetermined ghosting model and/or features associated with the one or more players at the time point. Such a technique may enable users to visualize the positional differences between actual player movements and ghosted player movements. Additionally, such a technique avoids the need for man-years of manual annotation and can be trained in several hours after which it can ghost every play in real-time. The differences between the ghosted movement paths and the actual movement paths may then be used to identify what the players should have done, or what the team did that allowed the opposing team to be successful on the play.

Using the ability to ghost movement paths, an embodiment may provide a system that can capture user input, for example, a play sketch, and then provide a visualization of how the play will unfold with an estimated movement for the movements of the opposing team. As an example, a coach may sketch a play onto an input area (e.g., a touch surface of a device or coupled to a device, a paper scanned into a device, etc.). The system may then analyze the play sketch and provide a visualization of the player movements and possible movements of players on the opposing team. This allows the user to determine a likelihood of success of the play and to identify the necessary locations for players on the team.

The illustrated example embodiments will be best understood by reference to the figures. The following description is intended only by way of example, and simply illustrates certain example embodiments.

Referring now to FIG. 1, an embodiment may use a predetermined ghosting model to determine a ghosted movement path for one or more players during a sequence in a game, for example, a play, a predetermined time interval, or the like. At 101, an embodiment may train a neural network associated with a predetermined ghosting model to predict, or "ghost" player movements for one or more players during at least one sequence in a game. In an embodiment, a game may refer to a sporting match (e.g., soccer, basketball, football, etc.) and a sequence in the game may refer to a predetermined time interval in the game, for example, a play, a defensive sequence, a preselected time period, or the like. As a non-limiting example, a defensive sequence may refer to a situation where an opposing team (e.g., the team not being selected for ghosting, etc.) has possession of the ball and is attempting to score points for their side. In an embodiment, "ghosted" player movements may refer to a prediction of the actions and/or movements one or more players may have conducted if those players acted in accordance with a particular predetermined ghosting model.

As data comes from different teams and players, a component of the neural network training is role alignment (i.e., ordering the players in a form where the computer can quickly compare strategically similar plays). In an embodiment, the dominant role for each player may be extracted from both the defending and attacking team based on the centroid positions throughout the segment of play, regardless of the nominal position of such player. For example, a player whose nominal role is central defender may find himself occupying the dominant role of a midfielder in certain sequences of play. Instead of enforcing a pre-determined formation onto the teams, the centroid positions for each sequence may be automatically discovered from data by clustering each role (e.g., through a linear assignment algorithm, etc.) to a role centroid represented by a mixture of Gaussian distributions in a way that maximizes the self-consistency within the role from one segment of play to another.

In an embodiment, recurrent neural networks may be used to learn the fine-grained behavior model for each role in the formation in each time step. In an embodiment, a neural network capable of capturing long-range dependencies in sequential data (e.g., a Long Short-Term Memory (LSTM) neural network, etc.) may be utilized. A model may take in a sequence of input feature vectors, as described above, and the corresponding sequence of each player's positions as output labels. Each player is modeled, for example, by an LSTM, which consists of two hidden layers of networks with, for example, 512 hidden units in each layer. The role of these hidden units is to capture the information from the recent history of actions from all players and map the information to the position of the next time step.

In an embodiment, the weights of a LSTM network may be determined by back-propagating a loss between a predicted location of a player, and the corresponding actual location of the player. Additionally, the input features may be computed dynamically based on previous predictions generated by the LSTM. Furthermore, additional losses computed over longer prediction intervals (e.g., estimating where a player will be two frames in the future, etc.) may be used to refined LSTM weights. Similarly, the input features may be computed from the previous predictions generated by other LSTMs as well, which predict locations for teammates.

The neural network may be utilized to train a predetermined ghosting model to predict, or "ghost", player movements according to a feature representation of the predetermined ghosting model. The feature representation of each predetermined ghosting model defines what information is encoded with the input feature vectors. In an embodiment, the predetermined ghosting model may be one of a league average ghosting model (e.g., how a typical team in a sports league would execute a sequence responsive to a particular offensive sequence), a team-specific ghosting model (e.g., how a specific team in a sports league would execute a sequence responsive to a particular offensive sequence), and a player-specific ghosting model (e.g., how a specific player may react responsive to a particular offensive sequence). As an example use-case, utilizing a team-specific ghosting model, an embodiment may be able to determine how a particular team would have executed a defensive sequence in response to a particular offensive sequence.

An embodiment may be able to automatically identify when a defensive sequence has begun by recognizing various context cues from the game (e.g., an embodiment may identify a sequence as a defensive sequence when the opposing team has possession of the ball, when the majority of action takes place on the target team's side of the field or court, etc.). In another embodiment, a user may identify a sequence as a defensive sequence by selecting a time interval of the game for ghosting analysis.

Figure 2A:
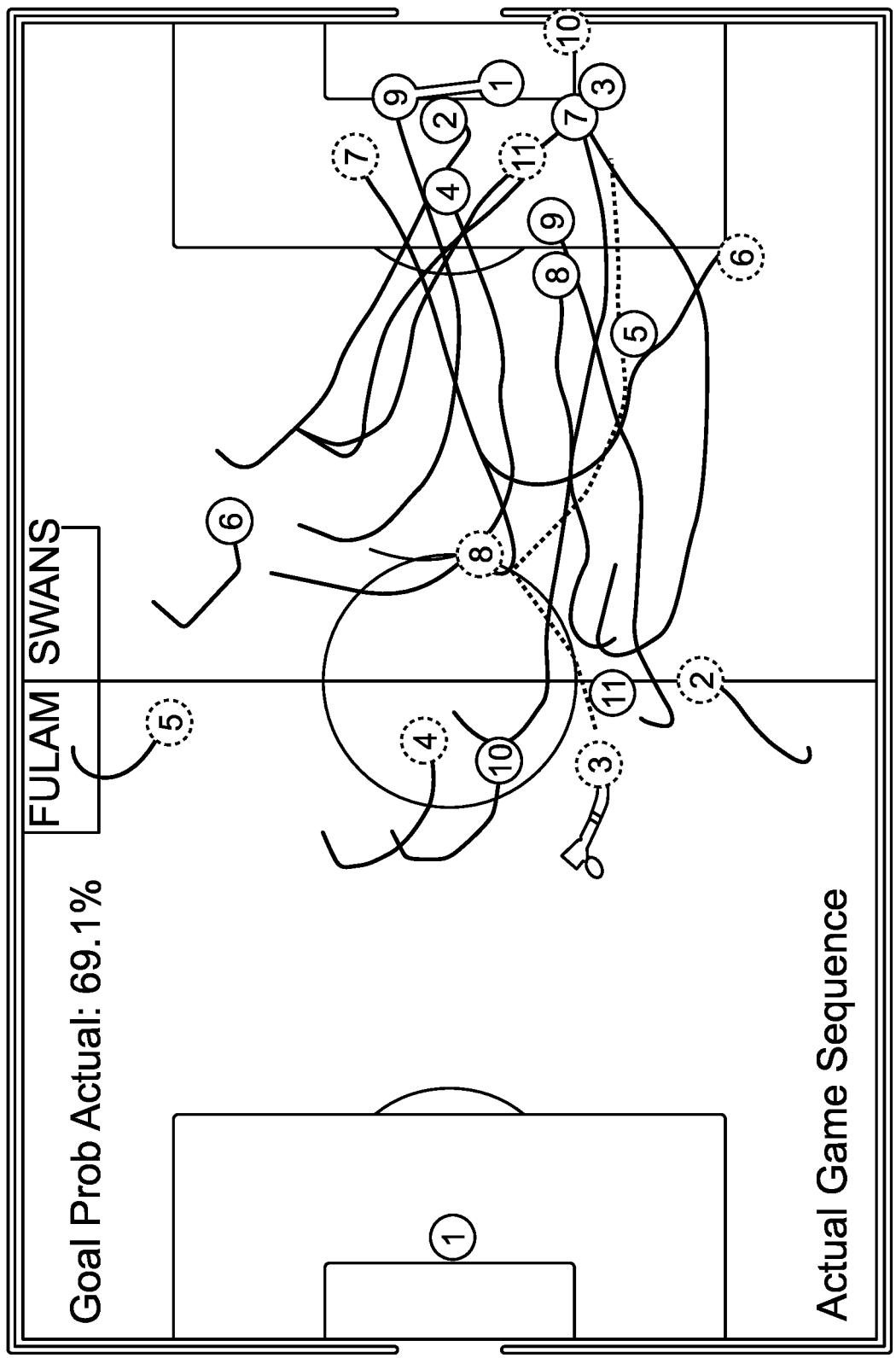
FIG. 2A illustrates an example representation of player movement paths.

At 102, an embodiment may receive tracking data associated with a player movement path for at least one player during a sequence in a game. In an embodiment, the tracking data may correspond to a completed portion of a game (e.g., a single defensive sequence, etc.) or a completed game. The player movement paths associated with the tracking data may correspond to the actual movements of the one or more players during the sequence. For example, referring now to FIG. 2A, a non-limiting example visualization is provided of player movement paths for all players (i.e., both offense and defense) in a game for a particular sequence. The visualization of the player movement paths may be provided, for example, on one or more display screens.

Each player's movement path may be represented by a combination of a stem and a node. The node may represent the player's position on the field at the time of visualization and the stem may correspond to the movement of the player up to that point in time. For example, in FIG. 2A, player 2 started a particular sequence at position A and finished the sequence stationed at position B. The stem is representative of player 2's movement from position A to position B and the node represents player 2's current position at the time of visualization, which is position B.

In an embodiment, the tracking data may be received in substantially real-time. For example, an embodiment may be provided with the tracking data associated with a currently occurring game. The movements of the players in the game may be continuously tracked (e.g., utilizing sensors attached to clothing of the players, etc.) and their spatial positions continuously updated and provided to the system.

At 103, an embodiment may analyze the tracking data to determine at least one feature associated with one or more players at predetermined time points during the sequence. In an embodiment, a feature may correspond to a data point that reflects how a particular player is visualizing, or experiencing, a sequence at a particular point in time. In an embodiment, the feature may correspond, for example, to a distance between the player and another player, a distance from the player to the ball, an angle of the player to the ball, and the like. An embodiment may also identify or determine other metrics, called context metrics, for example, the fatigue of the player, the speed and/or skill level of an opposing player or team, the speed and/or skill level of the player and their team, and the like, and utilize this information in conjunction with the metrics derived from the tracking data. The values associated with the different features and/or context metrics may be determined by compiling and utilizing information from various data sources (e.g., statistical information associated with individual players and/or teams, spatial calculations between players, player biometric data, etc.).

In an embodiment, the features and/or context metrics for one or more players may change as a sequence progresses. For example, due to the highly dynamic nature of sports (i.e., the frequent movement of players and balls during a game) the position of the one or more players is likely to change with each passing second or with each different frame. Therefore, an embodiment may determine features and/or context metrics associated with the one or more players at multiple predetermined time points (e.g., at each second of the sequence, at each new frame of the sequence, etc.). A continuous determination of features and/or context metrics at different time points throughout a sequence may provide enough information to replicate how a player or team experiences the entire sequence.

In an embodiment, the analysis of the tracking data may be conducted in substantially real-time. For example, an embodiment may receive video data from a live game feed and analyze that live video data as it is being received.

At 104, an embodiment may determine a ghosted movement path for one or more players using a predetermined ghosting model and the measured features and/or context metrics. In an embodiment, the ghosted movement path may be generated beginning from one of the predetermined time points. For example, if a predetermined time point is a beginning of a sequence, the ghosted movement path may be generated for a player or team for the entirety of the sequence. In another embodiment, the ghosted movement path may be generated for only a portion of the sequence. For example, a user may specify an interval of time to be ghosted (e.g., from game time 5 minutes to game time 5 minutes, 5 seconds, etc.).

Figure 2B:
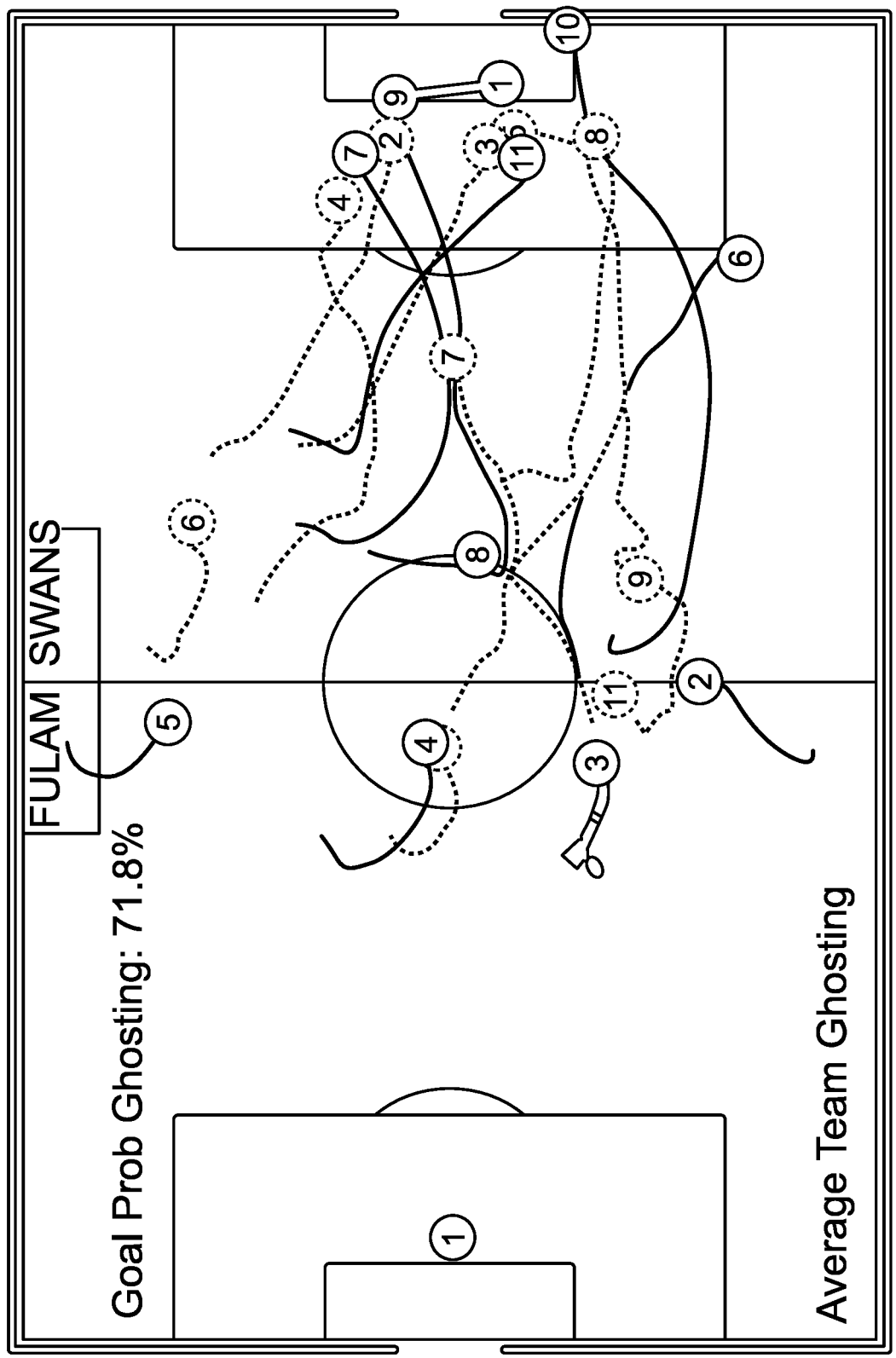
FIG. 2B illustrates an example representation of a ghosted movement path based upon a league-average ghosting model.
Figure 2C:
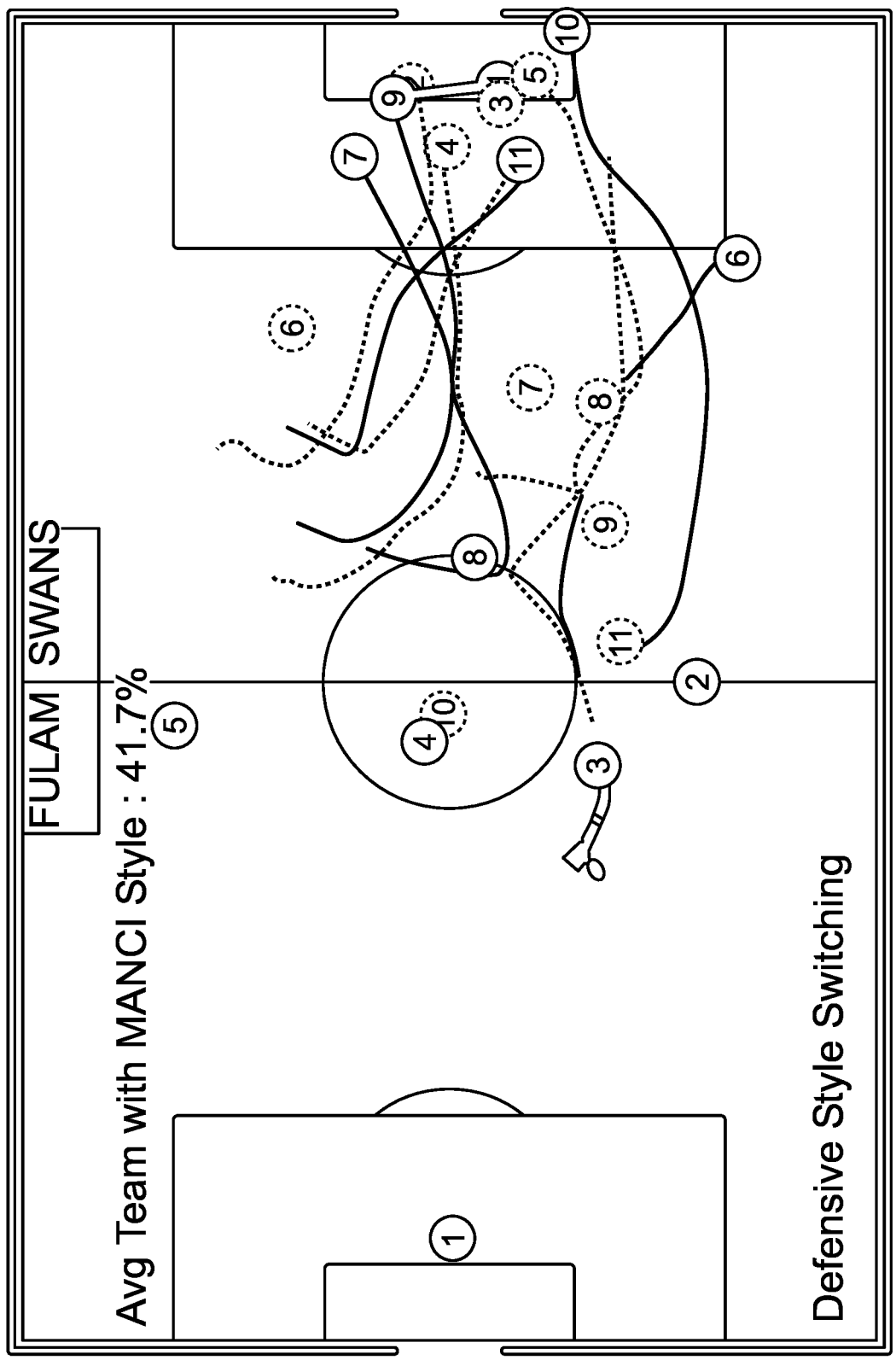
FIG. 2C illustrates an example representation of a ghosted movement path based upon a team-specific ghosting model.

The generation of the ghosted movement path may be dependent on one or both: the feature information and/or context metrics for the target player or team at the time of ghosting and/or the selected predetermined ghosting model. For example, referring now to FIG. 2B, an embodiment may determine a ghosted movement path for a team of players based upon how a typical team in a sports league (i.e., using a league-average ghosting model) would respond to a particular offensive formation. In another embodiment, referring now to FIG. 2C, an embodiment may determine a ghosted movement path for a team of players based upon how a specific team in a sports league (i.e., using a team-specific ghosting model) would respond to a particular offensive formation. As can be seen from a comparison between the two models, the ghosted movements of each of the players varies as a result of the feature representation associated each ghosting model.

Depending on the feature information and/or context metrics at the predetermined time point of ghosting, the ghosted movement path may change. For example, if an embodiment determined that a player was fatigued and matched up against an opposing player of significantly higher skill, an embodiment may generate a ghosted path that may, for example, adopt a less aggressive defensive approach. Additionally or alternatively, an embodiment may alter the ghosted movement of another player to aid in the defense of the highly skilled player.

Figure 2D:
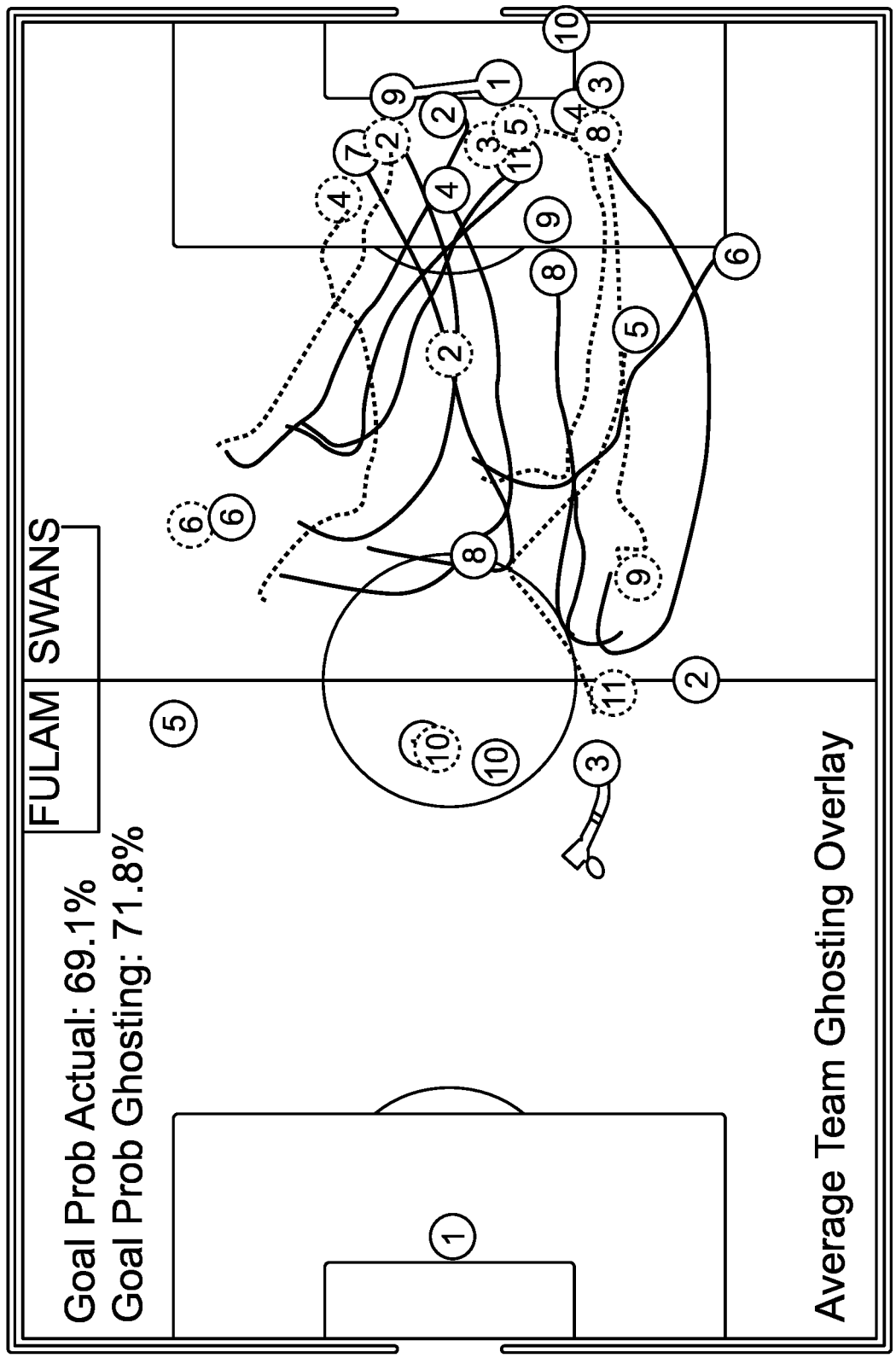
FIG. 2D illustrates an example representation of a superimposition of ghosted movement paths with player movement paths.

Referring now to FIG. 2D, the ghosted movement path may be superimposed, or co-displayed (e.g., on a single display screen), with the actual movement path of the player. Such a superimposition may allow users to visualize the positional differences between the movement path taken by the actual player and the movement path of the ghosted model. In an embodiment, the ghosted movement path may be visually distinguished from the movement path of the actual player (e.g., by utilizing a different color for the path, etc.). As previously mentioned, the stem-node visualization is a non-limiting example of how a player movement path and a ghosted movement path may be portrayed and a skilled practitioner will recognize that other visualizations may be utilized. For example, images of the actual player on the field may be co-displayed with a three dimensional ghosted player resembling the actual player's likeness. Additionally, this overlapped image may be adjusted by a user. For example, a television commentator discussing a particular sequence may interact with and manipulate the visualization to describe how hypothetical movements of the player may affect the ghosted movement path.

Figure 3A:
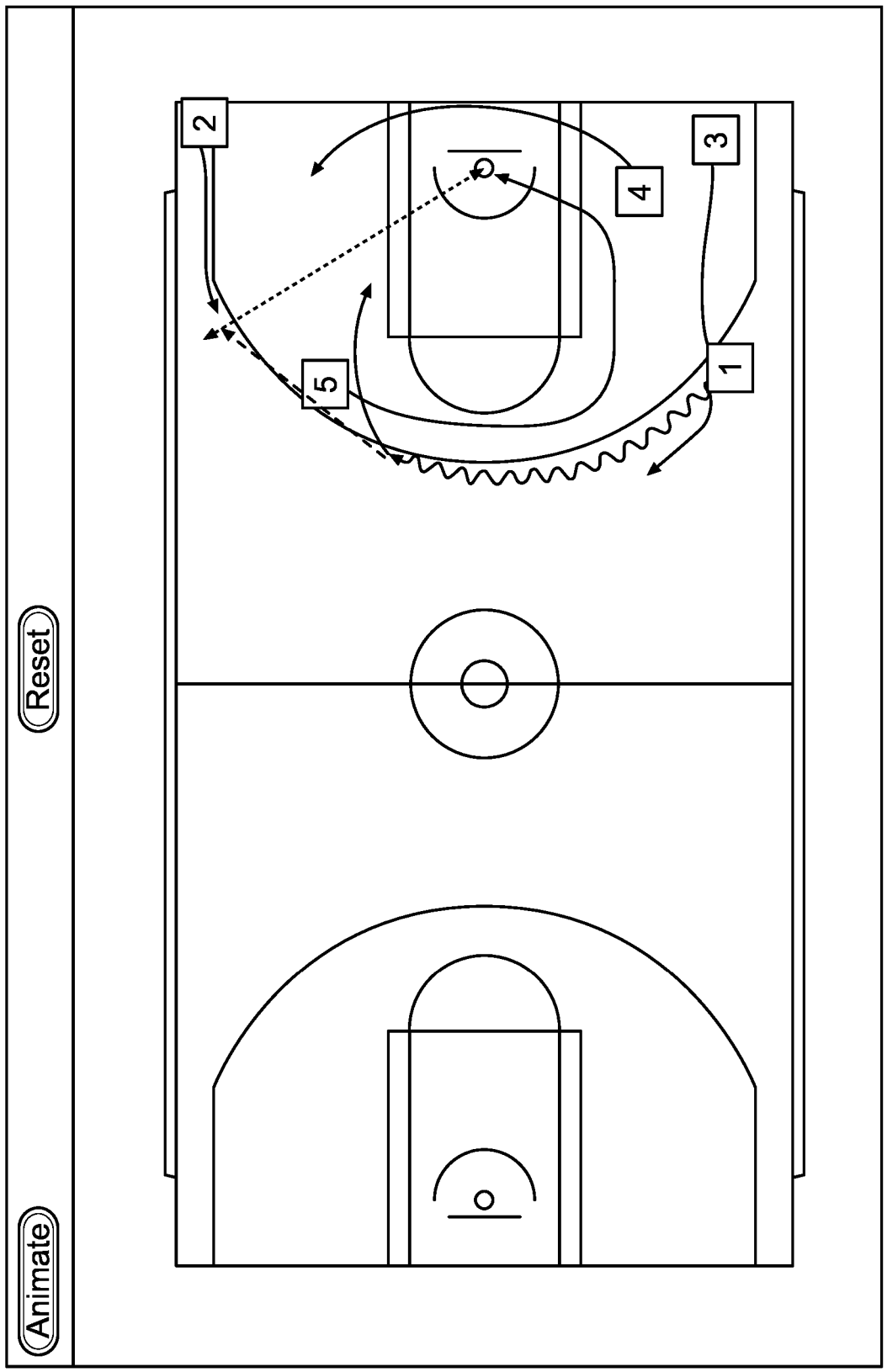
FIG. 3A illustrates an example representation of an interactive play sketching interface.

Referring now to FIGS. 3(A-B), an example use-case of real-time generation of ghosted movement paths is illustrated. In an embodiment, a user may utilize an interactive sketching tool (e.g., a stylus, a finger, etc.) (not pictured) to sketch hypothetical offensive player formations comprising offensive player starting positions and ball movement paths on a mobile electronic device (e.g., a tablet, etc.). For example, in FIG. 3A, a graphical user interface comprising a top-view of a basketball court may be displayed on the display screen of a tablet. Symbols (e.g., rectangles, etc.) comprising numbers (e.g., from 1-5, etc.) may represent the starting positions in a given play sequence for each of the offensive players. Lines (e.g., unbroken lines, dotted lines, dashed lines, etc.) may extend from the symbol locations and may represent the movement paths of the offensive players and the ball during the play sequence. A user may set the starting positions of the offensive players by, for example, tapping, using the sketching tool, on a spot on the digital basketball court. The symbol representing the offensive player may then appear at the location of the tap. Additionally, a user may set the movement paths for the offensive players by, for example, dragging the sketching tool from the desired offensive player to form a desired path the user wishes the offensive player to move along. Responsive to receiving activation input (e.g., the pressing of a hard or soft "start" button by a user, etc.), the sketched offensive players may become animated and move along the drawn movement paths to execute the play.

Figure 3B:
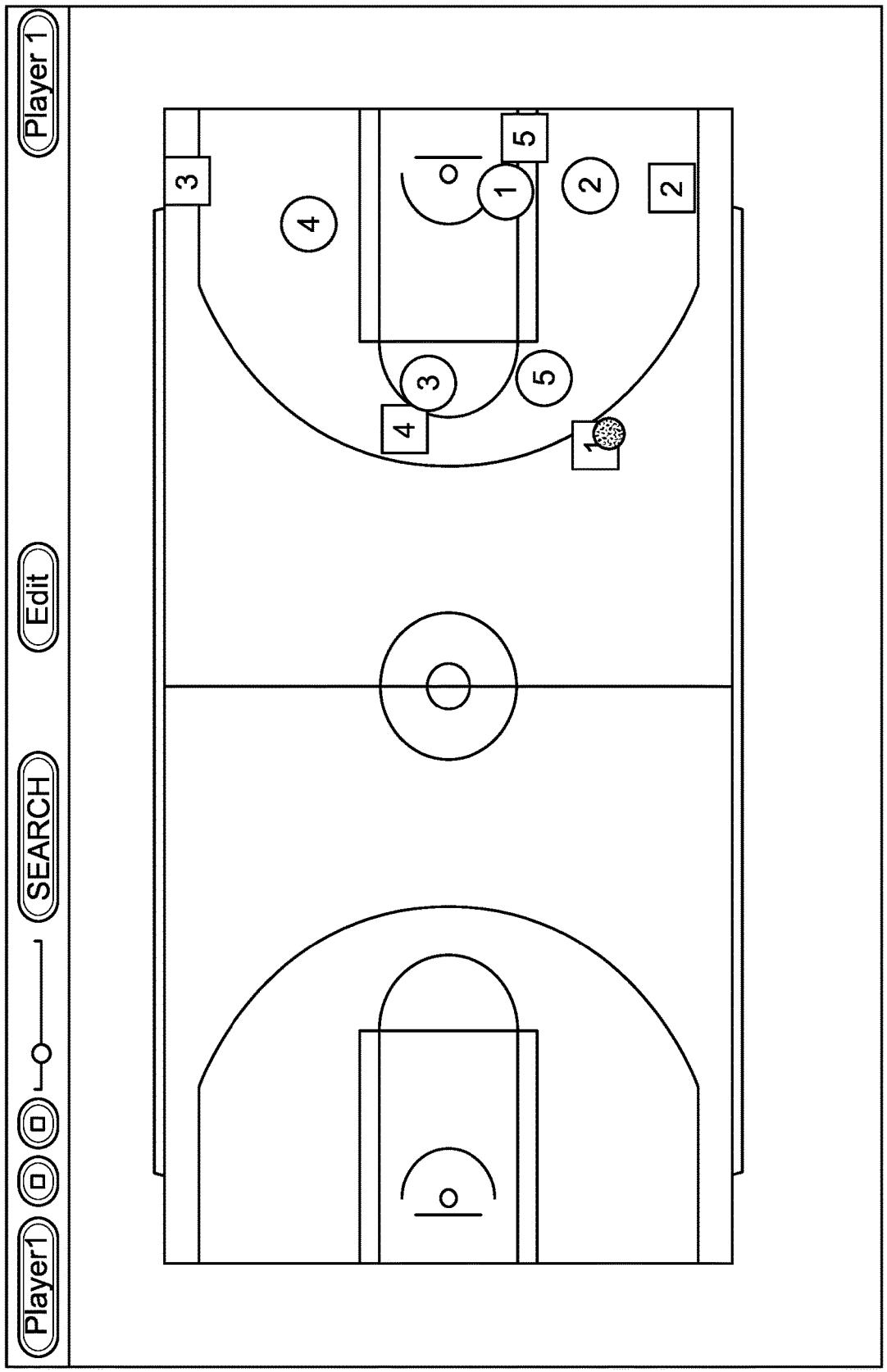
FIG. 3B illustrates an example representation of the interactive play sketching interface comprising ghosted players.

A user may then see how an opposition may respond to a given offensive formation by providing input to activate a ghosting response. The ghosting response may reflect how a particular team may defend a sketched offensive play. In an embodiment, the ghosting response may be dependent on a chosen predetermined ghosting model (e.g., a ghosting model associated with a team a user's team is currently playing, etc.). Referring now to FIG. 3B, responsive to receiving another command from the user to load a ghosting response (e.g., the pressing of a hard or soft "ghost" button, etc.), an embodiment may load symbols representing defensive players that are different than the symbols used to represent the offensive players (e.g., different colors, different shapes, etc.). In the example embodiment illustrated in FIG. 3B, the defensive players are represented by circles. An embodiment may then position the symbols representing the defensive players on the digital basketball court. In an embodiment, the defensive players may originally be positioned in a predetermined formation (e.g., a standard 3-2 defensive formation, etc.).

An embodiment may then analyze a single frame from the animated offense sequence to determine where the offensive players are positioned and thereafter correspondingly move the defensive players to a position they would be in to defend the offensive players based on the chosen ghosting model. The defensive players in the embodiment may then move in accordance with the chosen ghosting model as the play progresses. Additionally, the ghosted movement paths of the defensive players may also be influenced by one or more features and/or context metrics that may either be known by the ghosting model (e.g., speed of each of the defensive players, height of the defensive players, etc.) or that may be game-specific and may be entered by a user (e.g., that a particular defensive player is fatigued at a certain point in the game, a particular defensive player is slightly injured, etc.). Such an interface may enable users to sketch numerous offensive plays to see which plays may be effective against a particular defense.

An embodiment may also contain an expected point value (EPV) box that is integrated with the interface and co-displayed on the display screen with the digital playing arena. In an embodiment, as a user begins to make changes to the sketched offensive play (e.g., adjust the starting positions of the offensive players, adjust the movement paths of the offensive players, etc.) the EPV may dynamically change responsive to those changes. Additionally, if an embodiment comprised a database of every offensive play that had been run and a result thereof (i.e., was the offensive play successful or not), an embodiment may provide a recommendation (e.g., in a sub-screen co-displayed with the digital playing arena, etc.) of starting locations and/or movement paths of the offensive players for a given sequence. For example, if a user begins drawing a movement path for an offensive player, an embodiment may recommend a starting position and movement path of one or more other offensive players. The recommendation may be, for example, a visual recommendation (e.g., an image of the player and their movement path, etc.), an audible or text-based recommendation (e.g., an embodiment may describe, in words, where to position the player and how to draw the movement path, etc.), and the like.

The various embodiments described herein thus represent a technical improvement to conventional data-driven ghosting techniques. Using the methods and systems as described herein, one or more predetermined ghosting models may be trained to predict player movements by using deep imitation learning. Embodiments may receive tracking data associated with one or more player movement paths for a sequence and thereafter analyze the tracking data to determine at least one feature associated with the one or more players. Based upon the information available in the trained predetermined ghosting models, as well the determined feature information and/or context metrics, embodiments may determine a ghosted movement path for the one or more players. Such techniques enable users to receive a visualization of how another player, team, etc. would have reacted to a particular sequence in a game.

Figure 4:
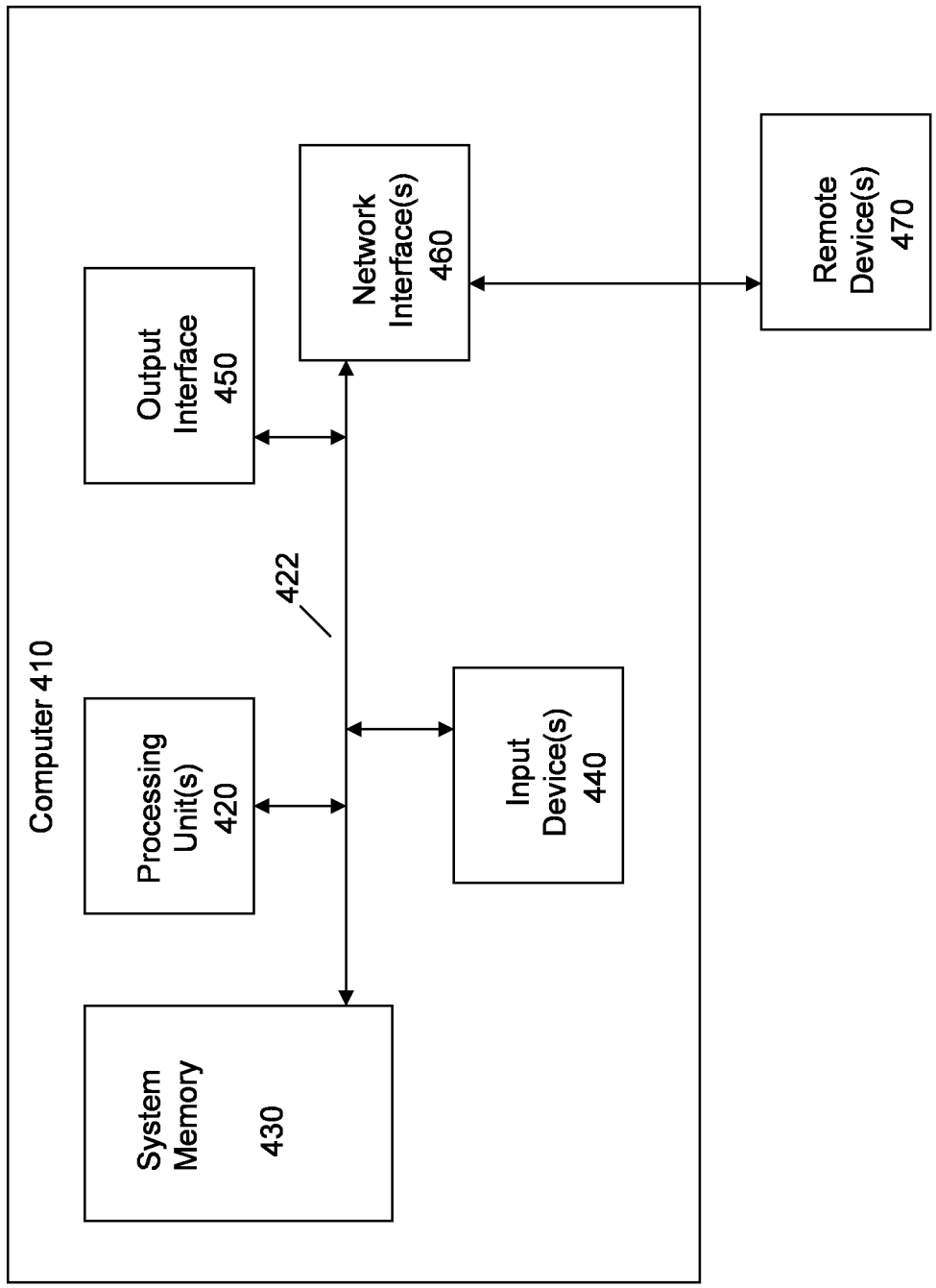
FIG. 4 illustrates an example computing device.

It will be readily understood by those having ordinary skill in the art that a variety of computing devices may be employed in implementing various embodiments. For example, FIG. 4 depicts an example information handling device 410 that may be used to implement embodiments herein. For example, the system of FIG. 4 may be used to monitor and analyze the user's compliance with a compliance step. The system of FIG. 4 may also be used to identify a user, the operational task to be performed by the user, the tasks to be completed by the user, and the like.

Components of information handling device 410 may include, but are not limited to, at least one processing unit 420, a system memory 430, and a system bus 422 that couples various system components including the system memory 430 to the processing unit(s) 420. The information handling device 410 may include or have access to a variety of computer readable media. The system memory 430 may include computer readable storage media in the form of volatile and/or nonvolatile memory such as read only memory (ROM) and/or random access memory (RAM). By way of example, and not limitation, system memory 430 may also include an operating system, application programs, other program modules, and program data.

A user can interface with (for example, enter commands and information) the information handling device 410 through input devices 440. A monitor or other type of device can also be connected to the system bus 422 via an interface, such as an output interface 350. In addition to a monitor, information handling devices may also include other peripheral output devices. The information handling device 410 may operate in a networked or distributed environment using logical connections (network interface 460) to other remote computers, databases, cameras, sensors or devices (remote device(s) 470). The logical connections may include a network, such as a local area network (LAN) or a wide area network (WAN), or a cellular network, but may also include other networks.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   training, using deep imitation learning, a neural network associated with a predetermined ghosting model to predict player movements for at least one player during at least one sequence in a game by back-propagating a loss between the predicted player movements and actual player movement, based on a difference of dynamic positions of the actual player movement compared to the predicted player movement for at least one player during at least one sequence in a game;
   defining a role for the at least one player prior to a plurality of sequences in the game, wherein the role is an expected play position for the at least one player during the at least one sequence in the game;
   training the neural network to align roles of a plurality of players ordered in a strategic form to compare plays of the plurality of players that align;
   receiving, at an information handling device, tracking data associated with a player movement path for the at least one player during the at least one sequence;
   receiving, at the information handling device, a context metric for one of the at least one player or an opposing player during the at least one sequence;
   analyzing, using a processor, the tracking data to determine at least one feature associated with the at least one player at a plurality of predetermined time points during the at least one sequence; and
   determining, using the predetermined ghosting model, the context metric and the at least one feature, a ghosted movement path for the at least one player beginning from one of the plurality of predetermined time point, wherein the ghosted movement path for the at least one player.

2. The method of claim 1, further comprising providing, on at least one display screen, a visualization of positional differences between the player movement path and the ghosted movement path.

3. The method of claim 2, wherein the providing comprises providing the visualization of the positional differences as an overlapped image.

4. The method of claim 2, further comprising adjusting at least a portion of the visualization responsive to receiving user adjustment input.

5. The method of claim 1, wherein the predetermined ghosting model is selected from a group consisting of a league average ghosting model, a team-specific ghosting model, and a player-specific ghosting model.

6. The method of claim 1, wherein the at least one feature is selected from a group consisting of a distance between the at least one player and at least one other player in the game, and an angle of the at least one player to a game object.

7. The method of claim 1, wherein the at least one sequence corresponds to a predetermined time interval in the game.

8. The method of claim 1, wherein the at least one player comprises a team of players.

9. The method of claim 1, wherein the determining comprises continuously determining the ghosted movement path for the at least one player.

10. The method of claim 1, wherein the role is a nominal role that is an expected play position for the at least one player during the at least one sequence in the game, the method further comprising:
    extracting a dominant role for the at least one player using the a role alignment, wherein the dominant role is extracted based on centroid positions during a plurality of sequences in the game, and wherein the dominant role is different from the nominal role of the at least one player; and
    altering the predetermined ghosting model according to the extracted dominant role of the at least one player during the at least one sequence in the game.

11. The method of claim 1, wherein the context metric for the at least one player is associated with a fatigue condition of the at least one player.

12. The method of claim 1, wherein the context metric for the opposing player is associated with a skill level of the opposing player.

13. The method of claim 1, wherein the neural network is a Long Short-Term Memory (LSTM) neural network.

14. An information handling device, comprising:
    a processor;
    a memory device that stores instructions executable by the processor to:
    train, using deep imitation learning, a neural network associated with a predetermined ghosting model to predict player movements for at least one player during at least one sequence in a game by back-propagating a loss between the predicted player movements and actual player movement, based on a difference of dynamic positions of the actual player movement compared to the predicted player movement for at least one player during at least one sequence in a game;
    define a role for the at least one player prior to a plurality of sequences in the game, wherein the role is an expected play position for the at least one player during the at least one sequence in the game;
    train the neural network to align roles of a plurality of players ordered in a strategic form to compare plays of the plurality of players that align;
    receive tracking data associated with a player movement path for the at least one player during the at least one sequence;
    receive a context metric for one of the at least one player or an opposing player during the at least one sequence;
    analyze the tracking data to determine at least one feature associated with the at least one player at a plurality of predetermined time points during the at least one sequence; and
    determine, using the predetermined ghosting model, the context metric and the at least one feature, a ghosted movement path for the at least one player beginning from one of the plurality of predetermined time points.

15. The information handling device of claim 14, wherein the instructions are further executable by the processor to provide, on at least one display screen, a visualization of positional differences between the player movement path and the ghosted movement path.

16. The information handling device of claim 15, wherein the instructions executable by the processor to provide comprise instructions executable by the processor to provide the visualization of the positional differences as an overlapped image.

17. The information handling device of claim 15, wherein the instructions are further executable by the processor to adjust at least a portion of the visualization responsive to receiving user adjustment input.

18. The information handling device of claim 14, wherein the predetermined ghosting model is selected from a group consisting of a league average ghosting model, a team-specific ghosting model, and a player-specific ghosting model.

19. The information handling device of claim 14, wherein the at least one feature is selected from a group consisting of a distance between the at least one player and at least one other player in the game, an angle of the at least one player to a game object, fatigue of the at least one player, speed of the at least one player, and skill level of the at least one player.

20. The information handling device of claim 14, wherein the at least one sequence corresponds to a predetermined time interval in the game.

21. The information handling device of claim 14, wherein the instructions executable by the processor to determine comprise instructions executable by the processor to continuously determine the ghosted movement path for the at least one player.

22. The information handling device of claim 14, wherein the instructions are further executable by the processor to determine a series of subsequent movements required by the at least one player to match the player movement path to the ghosted movement path.

23. A product, comprising:
  a non-transitory storage device that stores code, the code being executable by a processor and comprising:
  code that trains, using deep imitation learning, a neural network associated with a predetermined ghosting model to predict player movements for at least one player during at least one sequence in a game by back-propagating a loss between the predicted player movements and actual player movement, based on a difference of dynamic positions of the actual player movement compared to the predicted player movement for at least one player during at least one sequence in a game;
  code that defines a role for the at least one player prior to a plurality of sequences in the game, wherein the role is an expected play position for the at least one player during the at least one sequence in the game;
  code that trains the neural network to align roles of a plurality of players ordered in a strategic form to compare plays of the plurality of players that align;
  code that receives tracking data associated with a player movement path for the at least one player during the at least one sequence;
  code that receives a context metric for one of the at least one player or an opposing player during the at least one sequence;
  code that analyzes the tracking data to determine at least one feature associated with the at least one player at a plurality of predetermined time points during the at least one sequence; and
  code that determines, using the predetermined ghosting model, the context metric and the at least one feature, a ghosted movement path for the at least one player beginning from one of the plurality of predetermined time points.

* * * * *